United States Patent [19]
Bendikas

[11] Patent Number: 6,067,023
[45] Date of Patent: May 23, 2000

[54] POWER DISTRIBUTION APPARATUS AND METHOD

[75] Inventor: Laura M. Bendikas, Chicago, Ill.

[73] Assignee: 3COM Corporation, Rolling Meadows, Ill.

[21] Appl. No.: 09/334,962

[22] Filed: Jun. 17, 1999

[51] Int. Cl.[7] .................................................. G08B 21/00
[52] U.S. Cl. ........................ 340/638; 340/639; 340/649; 340/650; 361/64; 361/641; 361/644
[58] Field of Search .................................... 340/638, 639, 340/649, 650, 651, 652, 501; 361/627, 634, 641, 644, 64; 364/560; 323/239

[56] References Cited

U.S. PATENT DOCUMENTS

| | | | |
|---|---|---|---|
| 4,706,073 | 11/1987 | Vila Masot | 340/639 |
| 5,537,026 | 7/1996 | Estes et al. | 323/239 |
| 5,670,936 | 9/1997 | Estes et al. | 340/501 |
| 5,671,161 | 9/1997 | Bennet et al. | 364/560 |
| 5,892,449 | 6/1997 | Reid et al. | 340/639 |
| 6,005,758 | 11/1998 | Spencer et al. | 361/64 |

*Primary Examiner*—Jeffery A. Hofsass
*Assistant Examiner*—Phung Nguyen
*Attorney, Agent, or Firm*—Baniak Nicholas Pine & Gannon

[57] ABSTRACT

An apparatus and method for distributing power includes a housing, at least one input terminal, and at least one output terminal. The input and output terminals are each positioned in the housing. The input terminal is operatively connected to the output terminal. At least one circuit breaker is positioned in the housing. The circuit breaker includes an on position and an off position. The circuit breaker is operatively connected to the input terminal and the output terminal. An alarm circuit is operatively connected to the output terminal to prevent an alarm signal when an electronic chassis is not operatively connected to the output terminal and the circuit breaker is in the off position.

12 Claims, 4 Drawing Sheets

POWER DISTRIBUTION APPARATUS AND METHOD

FIELD OF THE INVENTION

This invention relates generally to the field of power distribution devices, and in particular, to a power distribution apparatus for supplying power to a plurality of electronic modules mounted in an electronics cabinet.

BACKGROUND OF THE INVENTION

Electronic modules, such as network access servers, are typically housed in a cabinet in a stacked configuration. A power distribution panel is typically mounted in the cabinet to supply power to the various electronic modules within the cabinet. Conventional power distribution panels are typically box-like structures that include a plurality of power input terminals that are operatively connected to a plurality of power output terminals. Power cables are fed into the cabinet and are attached to the power input terminals to supply power to the power distribution panel. Power is then provided to each of the electronic modules by connecting cables from the power output terminals of the power distribution panel to the input terminals of the electronic modules.

Conventional power distribution panels typically include a plurality of push-pull circuit breakers that are operatively connected between the power input terminals and the power output terminals. There is typically one dedicated circuit breaker for each electronic module. Each circuit breaker may preferably have an "on" state and an "off" state.

A visual alarm indictor (such as a conventional LED) is typically operatively connected to the circuit breakers. When the power output terminals of the power distribution panel are operatively connected to the electronic modules, and the circuit breakers are in the "on" position, power is delivered from the power input terminals, through the power output terminals, to the electronic modules. If during operation one of the circuit breakers is tripped to the "off" position, the visual alarm indicator will illuminate to alert a technician that one or more of the electronic modules is not receiving power.

Problems arise when one of the electronic modules is removed from the electronics cabinet. To prevent power from being distributed from the power input terminal to the power output terminal for that electronic module, a technician must manually place the circuit breaker for that electronic module in the "off" position. However, placing the circuit breaker in the "off" position will result in an alarm condition being transmitted to the visual alarm indicator. Since the circuit breaker only has two positions, the only way to cure the false alarm is to manually place the circuit breaker in the "on" position. The problem with this solution is that when the circuit breaker is in the "on" position, power is delivered from the power input terminal to the output terminal Delivering power to a power output terminal that is not connected to a load creates a hazardous situation that may result in a short circuit or shock to the technician.

Accordingly, it would be desirable to have a power distribution apparatus that overcomes the disadvantages described above, and to provide a simple and cost effective power distribution apparatus.

SUMMARY OF THE INVENTION

One aspect of the invention provides an apparatus for distributing power including a housing, at least one input terminal, and at least one output terminal each positioned in the housing. The input terminal is operatively connected to the output terminal. At least one circuit breaker is positioned in the housing and has an on position and an off position. The circuit breaker is operatively connected to the input terminal and the output terminal. An alarm circuit is operatively connected to the output terminal to prevent an alarm signal when an electronic chassis is not operatively connected to the output terminal and the circuit breaker is in the off position. The circuit breaker may preferably be positioned in a front portion of the housing. The input terminal and output terminal may preferably be positioned in a back portion of the housing. The at least one input terminal may preferably include a plurality of input terminals, and the at least one output terminal may preferably include a plurality of output terminals. The at least one circuit breaker may preferably include a plurality of circuit breakers. At least one visual alarm indicator may preferably be positioned in the housing and may be operatively connected to the alarm circuit. The visual alarm indictor may preferably be positioned in a front portion of the housing. An alarm output connector may preferably be positioned in the housing and may be operatively connected to the alarm circuit. The alarm output connector may preferably be positioned in the back portion of the housing.

Another aspect of the invention provides a method of distributing power. A housing, at least one input terminal, and at least one output terminal each positioned in the housing are provided. At least one circuit breaker is positioned in the housing and has an on position and an off position. An alarm circuit is operatively connected to the output terminal. The input terminal is connected to the output terminal, and the circuit breaker is connected to the input terminal and the output terminal. An alarm signal is prevented when an electronic chassis is not operatively connected to the output terminal and the circuit breaker is in the off position.

Another aspect of the invention provides an apparatus for distributing power including a housing, at least one input terminal, and at least one output terminal each positioned in the housing. The input terminal is operatively connected to the output terminal. At least one circuit breaker is positioned in the housing and has an on position and an off position. The circuit breaker is operatively connected to the input terminal and the output terminal. An alarm circuit is operatively connected to the output terminal to provide an alarm signal only when an electronic chassis is operatively connected to the output terminal and the circuit breaker is in the off position.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE DRAWINGS

DETAILED DESCRIPTION OF THE PRESENTLY PREFERRED EMBODIMENTS

Figure 1:
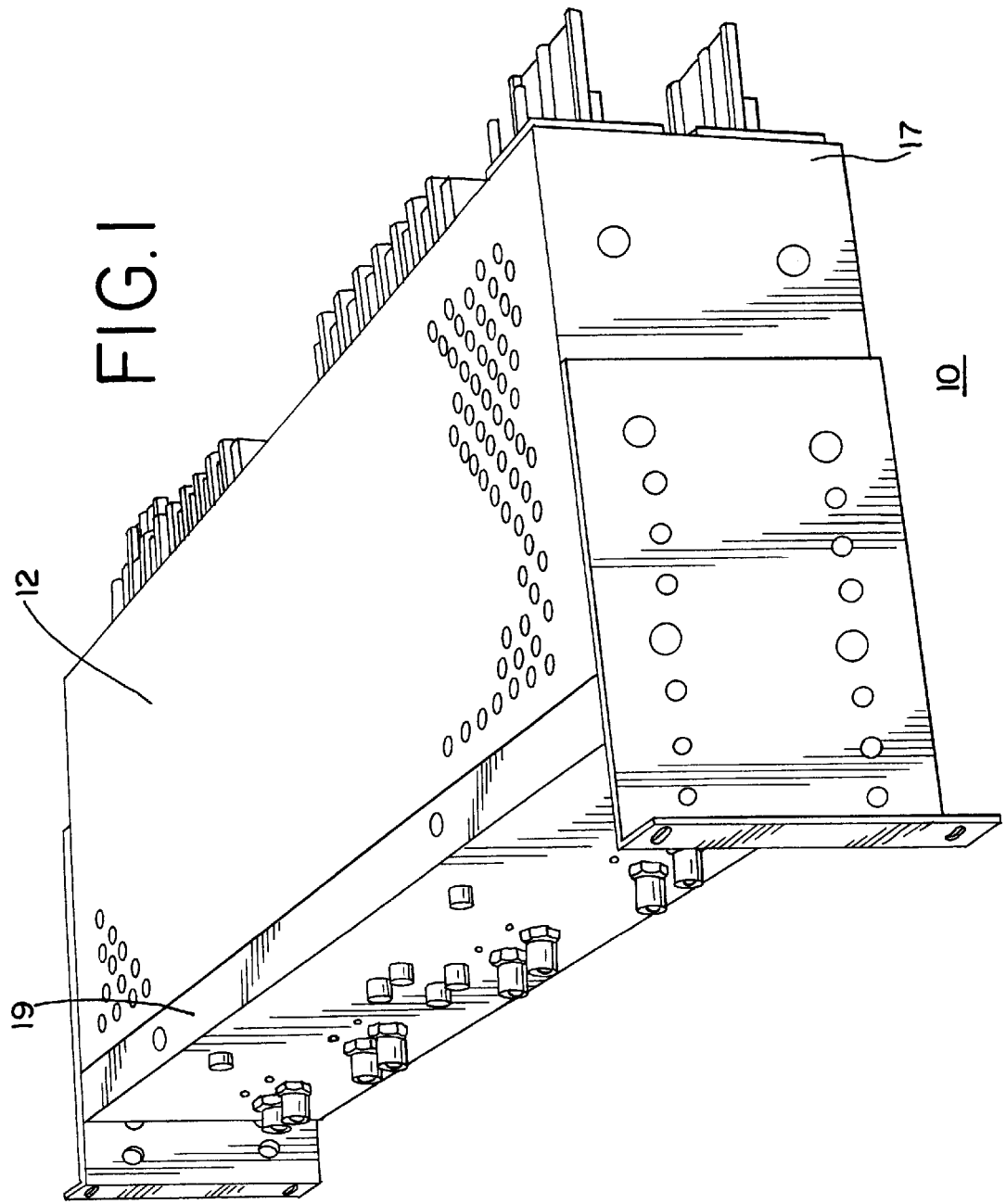
FIG. 1 is a perspective view of a preferred embodiment of a power distribution apparatus, which is made in accordance with invention.
Figure 2:
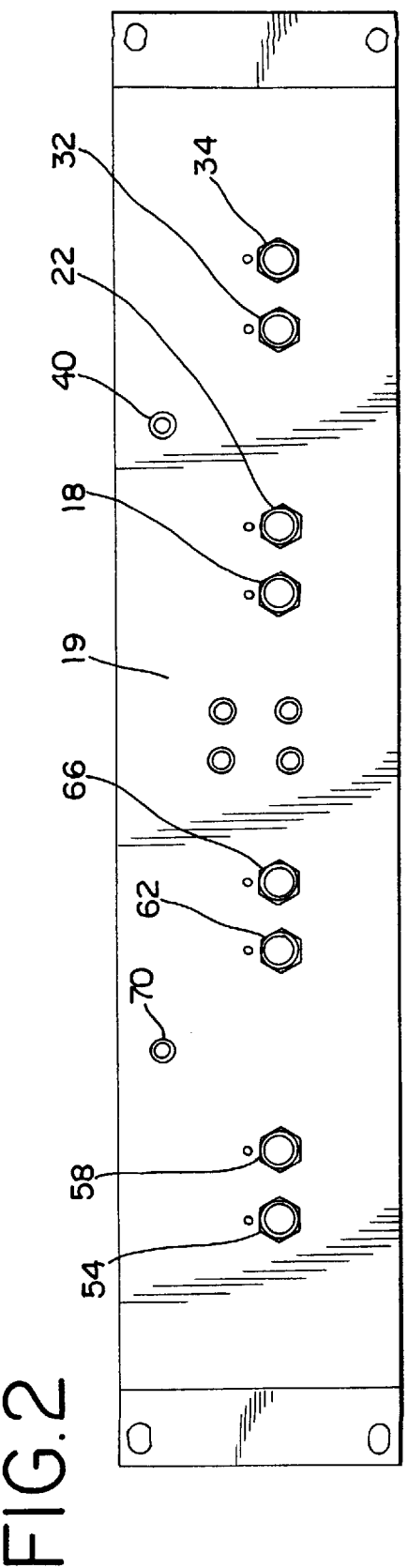
FIG. 2 is a front view of the power distribution apparatus of FIG. 1.
Figure 3:
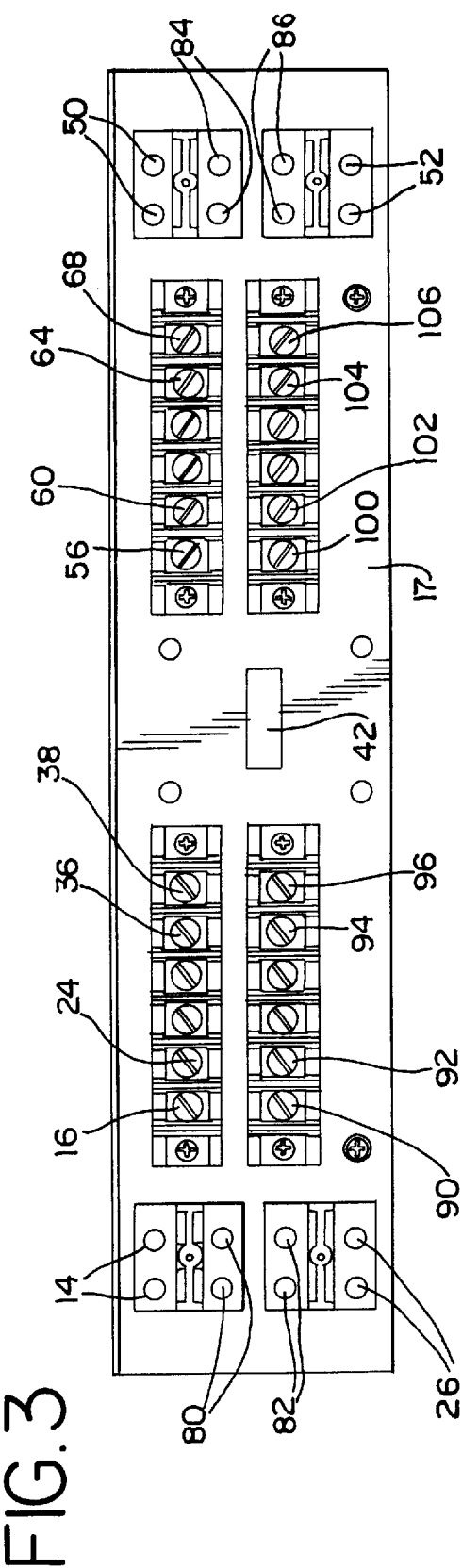
FIG. 3 is a back view of the power distribution apparatus of FIG. 1.
Figure 4:
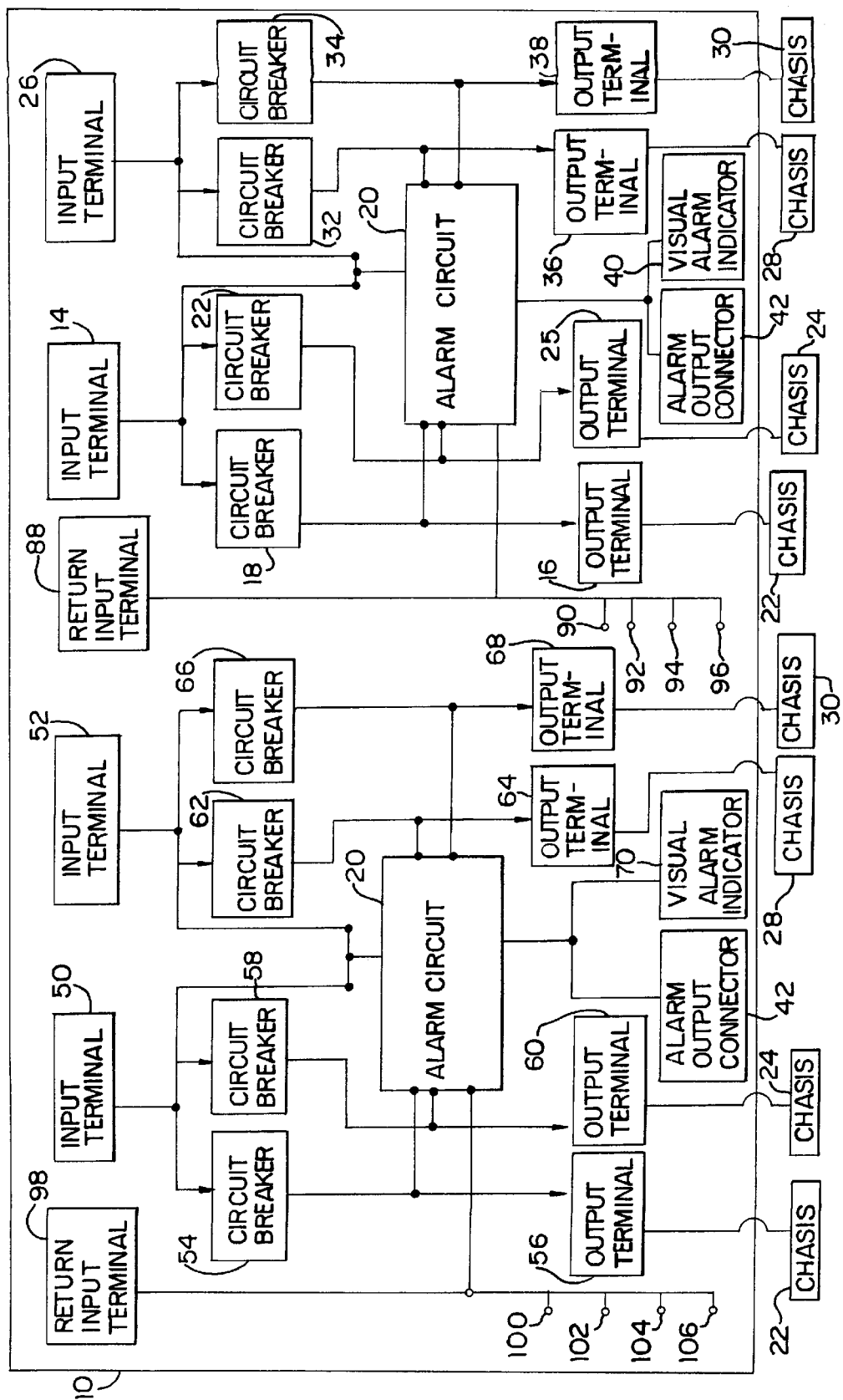
FIG. 4 is a block diagram illustrating the power distribution apparatus of FIG. 1 and a plurality of electronic chassis operatively connected to the power distribution apparatus.

Referring to FIGS. 1–4, a preferred embodiment of an apparatus 10 for distributing power to a plurality of electronic chassis comprises a housing 12. The housing 12 may preferably be any enclosure suitable for housing various electronic components. The housing 12 may preferably be any shape or size depending upon the particular application. Referring to FIGS. 2–4, a power input terminal 14 and a power output terminal 16 are each positioned in the housing 12. The power input terminal 14 and the power output terminal 16 may preferably be positioned in a back portion 17 of the housing 12. The power input terminal 14 is operatively connected to the power output terminal 16 within the housing 12.

At least one circuit breaker 18 is positioned in the housing 12. The circuit breaker 18 may preferably be positioned in a front portion 19 of the housing 12. The circuit breaker 18 includes an on position and an off position. The circuit breaker 18 may preferably be any thermal magnetic push-pull circuit breaker. The circuit breaker 18 is operatively connected to the power input terminal 14 and the power output terminal 16.

As shown in the embodiment of FIG. 4, power is supplied to an electronic chassis 22 via circuit breaker 18 and power output terminal 16. Similarly, power is supplied to a second electronic chassis 24 via circuit breaker 22 and power output terminal 25. A second power input terminal 26 may preferably provide power to electronic chassis 28 and 30 via circuit breakers 32 and 34 and power output terminals 36 and 38.

An alarm circuit 20 is operatively connected to the power output terminal 16. The alarm circuit 20 provides an alarm signal only when an electronic chassis 22 is operatively connected to the power output terminal 16 and the circuit breaker 18 is in the off position.

At least one visual alarm indicator 40 may preferably positioned in the housing 12. The visual alarm indicator 40 may preferably be operatively connected to the alarm circuit 20. The visual alarm indictor 40 may preferably be positioned in the front portion 19 of the housing 12. The visual alarm indicator 40 may preferably be any device that emits a visual signal such as, for example, a conventional two color LED. The visual alarm indicator 40 may preferably emit, for example, a green light and a red light.

An alarm output connector 42 may preferably be positioned in the housing 12. The alarm output connector 42 may preferably be positioned in the back portion 17 of the housing 12. The alarm output connector 42 may preferably be operatively connected to the alarm circuit 20. The alarm output connector 42 may preferably be a 9 pin D-SUB connector or a Molex-9 pin socket connector, depending on the particular application. The alarm output connector 42 may preferably provide a signal that is sent to a centralized control facility for monitoring alarms.

The apparatus 10 may preferably include a source of redundant power to electronic chassis 22, 24, 28, 30. Referring to FIGS. 2–4, power input terminals 50 and 52 may preferably provide the source of redundant power. Redundant power may preferably be supplied to electronic chassis 22 via circuit breaker 54 and power output terminal 56. Similarly, redundant power may preferably be supplied to electronic chassis 24 via circuit breaker 58 and power output terminal 60. Redundant power may preferably be supplied to electronic chassis 28 via circuit breaker 62 and power output terminal 64. Finally, redundant power may preferably be supplied to electronic chassis 30 via circuit breaker 66 and power output terminal 68.

A second visual alarm indicator 70 for the source of redundant power may preferably be positioned in the housing 12. The second visual alarm indicator 70 may preferably be positioned in the front portion 19 of the housing 12 and be operatively connected to the alarm circuit 20. The second visual alarm indicator 70 may preferably be any device that emits a visual signal such as, for example, a conventional two color LED. The second visual alarm indicator 70 may preferably emit, for example, a green light and a red light.

Referring to FIG. 3, a plurality of power return input terminals 80, 82, 84, 86 may preferably be provided. In the embodiment shown, power return input terminals 80 and 82 are electrically connected to each other (the combination of the power return input terminals 80 and 82 is designated as 88 in FIG. 4). The power return input terminals 80 and 82 are operatively connected to a plurality of power return output terminals 90, 92, 94, 96. The power return output terminals 90, 92, 94, and 96 may preferably be operatively connected to electronic chassis 22, 24, 28, and 30, respectively. Similarly, redundant power return terminals 84 and 86 are electrically connected to each other (the combination of the redundant power return terminals 84 and 86 is designated as 98 in FIG. 4). The redundant power return input terminals 84 and 86 are operative connected to a plurality of power return output terminals 100, 102, 104, 106. The redundant power return output terminals 100, 102, 104, and 106 may preferably be operatively connected to electronic chassis 22, 24, 28 and 30, respectively.

In operation, when the electronic chassis 22 is connected to the power output terminal 16 and the circuit breaker 18 is in the "on" position, the alarm circuit 20 will cause the visual alarm indicator 40 to emit a green signal. If the electronic chassis 22 is connected to the power output terminal 16 and the circuit breaker 18 is in the "off" position, then the visual alarm indicator 40 will emit a red signal or alarm signal. If the electronic chassis 22 is not connected to the power output terminal 16 and the circuit breaker 18 is in the "on" position, then the visual alarm indicator 40 will emit a green signal. If the electronic chassis 22 is not connected to the power output terminal 16 and the circuit breaker 18 is in the "off" or actuated position, then the visual alarm indicator 40 will emit a green signal. As a result, one advantage of the present invention is that it prevents an alarm signal (i.e. red signal) when the electronic chassis 16 is not operatively connected to the output terminal and the circuit breaker is in the "ofF" position. As a result, the electronic chassis 22 can be removed from an electronics cabinet and the circuit breaker 18 can be placed in the "off" position without causing the visual alarm indicator 40 to emit an alarm signal (i.e., red light) and preventing a hazardous situation to a technician.

Figure 5:
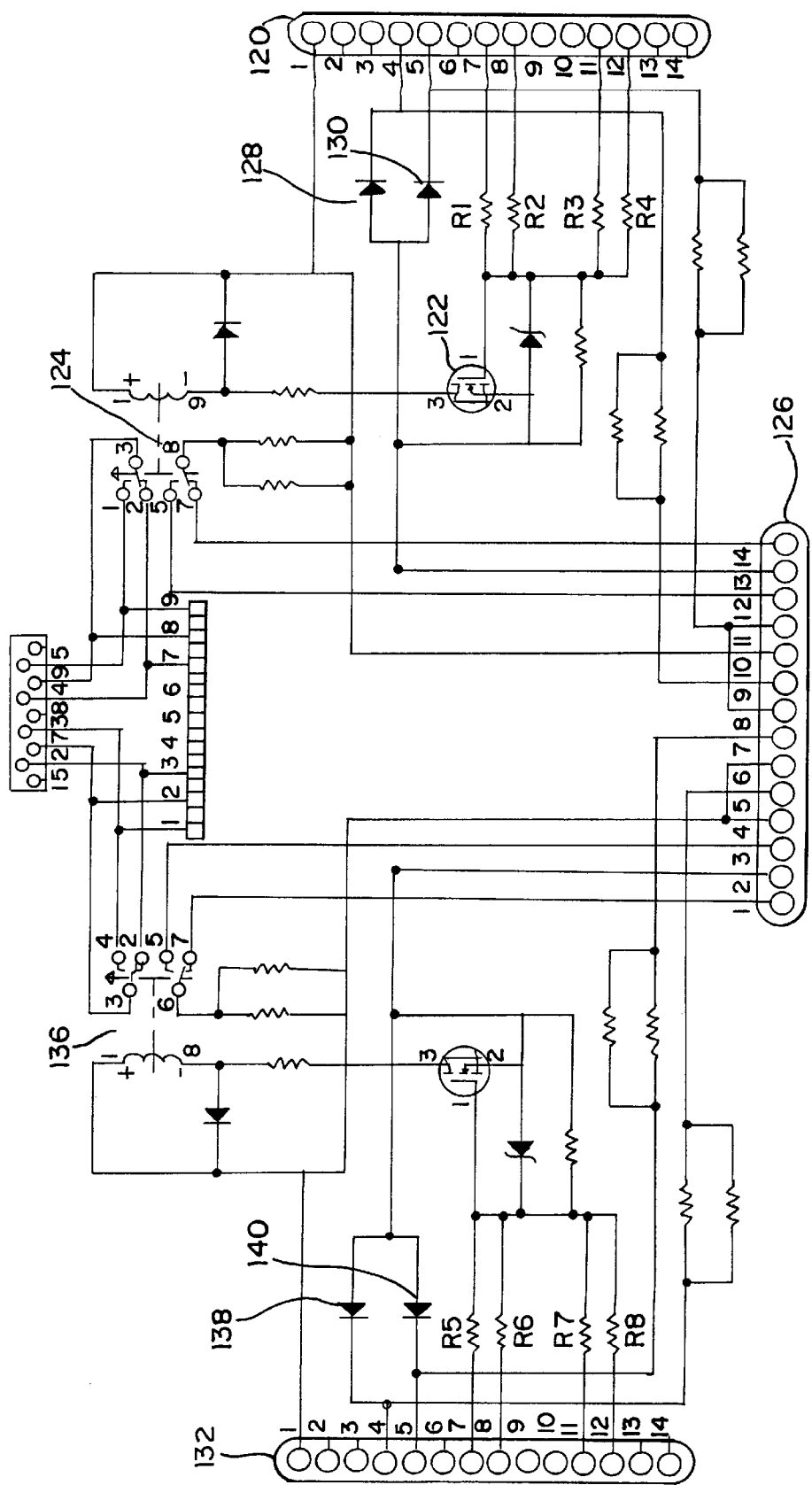
FIG. 5 is a circuit diagram illustrating a preferred embodiment of an alarm circuit.

FIG. 5 is a circuit diagram of a preferred embodiment of the alarm circuit 20. Under normal operating conditions, electronic chassis 22, 24, 28 and 30 may preferably be operatively connected to output terminals 16, 25, 36, and 38, respectfully, and all of the respective circuit breakers 18, 22, 32 and 34 are in the "on" position, which creates a closed circuit. The outputs of the circuit breakers 18, 22, 32, and 34 are operatively connected to pins 7, 8, 11, and 12 of connector 120, respectfully. In operation, current flows through the return via pin 1 of connector 120, through resistors R1–R4, through relay 124 (via pins 6 and 7 of relay 124) to pin 14 of connector 126 (green side of visual alarm indicator 40). Current also flows through the common cathode of the visual alarm indicator 40 (via pin 13 of connector 126) to the common power source, the anodes of diodes 128 and 130, which come from pins 4 and 5 of connector 120. The transistor 122 may preferably be de-energized because, with the power applied to the load side of the resistors R1–R4, the voltage at the gate of transistor 122 equals the voltage at the source of the transistor 122 and therefore, the transistor 122 remains off.

Since the electronic chassis 22, 24, 28, and 30 are connected between the circuit breakers 18, 22, 32, 34 and the return to form a closed circuit, loss of power to any one of the electronic chassis due to the corresponding circuit breaker being in an "off" position will cause current to flow through one of the corresponding resistors R1–R4. In this scenario (i.e., when an electronic chassis is connected to an output terminal, but there is loss of power), current will flow through the corresponding resistor thereby forming a voltage divider with the remaining resistors. The voltage at the gate of the transistor 122 will therefore become positive. As a result, the relay 124 will change state and current will flow from the relay 124 (via pins 5 and 6 of the relay 124) to the pin 12 of connector 126, which in turn is operatively connected to the red side of the visual alarm indicator 40.

If one of the electronic chassis is disconnected from its corresponding power output terminal, an open circuit is created, and the voltage at the gate of transistor 122 will remain equal to the voltage at the source of the transistor 122. For example, if electronic chassis 22 is disconnected from the power output terminal 16, current will not flow through resistor R1 in the alarm circuit 20. As a result, the gate and source voltages of the transistor 122 remain unchanged. Thus, the alarm circuit 20 does not recognize whether the circuit breaker 18 is in the "on" position or the "off" position when the electronic chassis 22 is disconnected. As a result, the visual alarm indicator 40 will remain green even if the circuit breaker 18 is in the "off" position.

The alarm circuit 20 shown in FIG. 5 may preferably include identical circuitry for the redundant power source. In particular, connector 132, resistors R5–R8, transistor 134, relay 136, and diodes 138 and 140 may preferably be connected in the same manner as connector 120, resistor R1–R4, transistor 122, relay 124, and diodes 128 and 130. The operation of the alarm circuit 20 for the redundant power source may preferably be the same as the operation described above.

It should be appreciated that a wide range of circuit configurations may be provided for the alarm circuit 20. Various digital and/or analog circuitry may be used to prevent an alarm signal when an electronic chassis is not operatively connected to an output terminal and the corresponding circuit breaker is in the off position.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. An apparatus for distributing power comprising:
a housing, at least one input terminal and at least one output terminal each positioned in the housing, the at least one input terminal operatively connected to the at least one output terminal, at least one circuit breaker positioned in the housing, the at least one circuit breaker having an on position and an off position, the at least one circuit breaker operatively connected to the at least one input terminal and the at least one output terminal, an alarm circuit operatively connected to the at least one output terminal to prevent an alarm signal when an electronic chassis is not operatively connected to the at least one output terminal and the at least one circuit breaker is in the off position.

2. The apparatus of claim 1 wherein the at least one circuit breaker is positioned in a front portion of the housing.

3. The apparatus of claim 1 wherein the at least one input terminal and the at least one output terminal are each positioned in a back portion of the housing.

4. The apparatus of claim 1 wherein the at least one input terminal comprises a plurality of input terminals.

5. The apparatus of claim 1 wherein the at least one output terminal comprises a plurality of output terminals.

6. The apparatus of claim 1 wherein the at least one circuit breaker comprises a plurality of circuit breakers.

7. The apparatus of claim 1 further comprising at least one visual alarm indicator positioned in the housing, the at least one visual alarm indicator operatively connected to the alarm circuit.

8. The apparatus of claim 7 wherein the at least one visual alarm indictor is positioned in a front portion of the housing.

9. The apparatus of claim 1 further comprising an alarm output connector positioned in the housing, the alarm output connector operatively connected to the alarm circuit.

10. The apparatus of claim 9 wherein the alarm output connector is positioned in the back portion of the housing.

11. A method of distributing power comprising:
providing a housing, at least one input terminal and at least one output terminal each positioned in the housing, at least one circuit breaker positioned in the housing, the at least one circuit breaker having an on position and an off position, an alarm circuit operatively connected to the at least one output terminal;
connecting the at least one input terminal to the at least one output terminal;
connecting the at least one circuit breaker to the at least one input terminal and the at least one output terminal; and
preventing an alarm signal when an electronic chassis is not operatively connected to the at least one output terminal and the at least one circuit breaker is in the off position.

12. An apparatus for distributing power comprising:
a housing, at least one input terminal and at least one output terminal each positioned in the housing, the at least one input terminal operatively connected to the at least one output terminal, at least one circuit breaker positioned in the housing, the at least one circuit breaker having an on position and an off position, the at least one circuit breaker operatively connected to the at least one input terminal and the at least one output terminal, an alarm circuit operatively connected to the at least one output terminal to provide an alarm signal only when an electronic chassis is operatively connected to the output terminal and the at least one circuit breaker is in the off position.

* * * * *